US012753951B2

(12) United States Patent
Khatri

(10) Patent No.: US 12,753,951 B2
(45) Date of Patent: Oct. 6, 2026

(54) COOLING SYSTEM OF A COLD PLATFORM AT CRYOGENIC TEMPERATURE AND METHOD THEREOF

(71) Applicant: Ajay Khatri, Bethlehem, PA (US)

(72) Inventor: Ajay Khatri, Bethlehem, PA (US)

(*) Notice: Subject to any disclaimer, the term of this patent is extended or adjusted under 35 U.S.C. 154(b) by 183 days.

(21) Appl. No.: 18/924,277

(22) Filed: Oct. 23, 2024

(65) Prior Publication Data

US 2026/0110459 A1 Apr. 23, 2026

(51) Int. Cl.

| | |
|---|---|
| ***F25B 9/00*** | (2006.01) |
| ***F25D 13/00*** | (2006.01) |
| ***F25D 19/00*** | (2006.01) |
| *B25J 21/00* | (2006.01) |
| *F25B 9/02* | (2006.01) |
| *F25B 19/00* | (2006.01) |

(52) U.S. Cl.

CPC .............. *F25B 9/002* (2013.01); *F25D 13/00* (2013.01); *F25D 19/006* (2013.01); *B25J 21/00* (2013.01); *F25B 9/02* (2013.01); *F25B 19/005* (2013.01)

(58) Field of Classification Search

CPC .......... F25B 9/002; F25B 9/02; F25B 19/005; F25D 13/00; F25D 19/006; F25D 3/102; B25J 21/00

See application file for complete search history.

(56) References Cited

U.S. PATENT DOCUMENTS

| | | | | |
|---|---|---|---|---|
| 8,516,834 | B2 | 8/2013 | Snow et al. | |
| 10,684,047 | B2 | 6/2020 | Khatri et al. | |
| 2018/0306685 | A1* | 10/2018 | Boguslavsky ....... | B28D 5/0023 |

* cited by examiner

*Primary Examiner* — Joseph F Trpisovsky

(74) *Attorney, Agent, or Firm* — Caesar Rivise, PC

(57) ABSTRACT

In order to help achieve the most refrigeration capacity and the lowest cryogenic temperature at a cold platform while using a manipulator setup, a cryogenic system having a cold platform is physically attached to at least one XYZ motion manipulator and angular motion manipulator to be cooled to cryogenic temperature of about 4K. The cryogenic temperature achieved by the system is similar to that achieved by the coldest stage of a cryocooler and at the same time provides significantly higher cryogenic refrigeration capacity in the range of 100 milli-watts to 1000 milli-watts in accordance with the refrigeration capacity of the cryocooler used in the system.

13 Claims, 4 Drawing Sheets

COOLING SYSTEM OF A COLD PLATFORM AT CRYOGENIC TEMPERATURE AND METHOD THEREOF

FIELD OF DISCLOSURE

This invention relates generally to cryogenic cooling systems, and more particularly, to cryogenic cooling of a cold platform in physical contact with manipulator(s) such that the cold platform can be moved in X-Y-Z and angular directions while maintaining a high refrigeration capacity and achieving minimum possible cryogenic temperature.

BACKGROUND

Cryogenic cooling using liquid helium as cryogenic fluid has been used to cool superconducting magnets to achieve high magnetic fields. In multiple applications in the fields of Physics, chemistry, etc. cryogenic systems are employed to cool a cold platform that holds an object (sample) under investigation at cryogenic temperatures, which is understood to span from about 120K down to close to absolute zero. A sample holder is generally attached to a cold platform to hold an object (Sample) under study. Alternatively, the sample may be directly mounted on the cold platform. In multiple applications it is necessary to have the ability to move the sample and the cold platform in a X direction (e.g., horizontal), a Y direction (e.g., vertical), a Z direction (e.g., orthogonal to X and Y directions), or in all directions by employing specialized high precision manipulators that are commercially available. Such manipulators are commercially available from companies such as Attocube, JPE Innovations, SmarAct and others and they are compatible to operate at cryogenic temperatures.

Researchers employing such apparatus prefer to achieve the lowest possible cryogenic temperature at the sample that a typical cryocooler can achieve at its coldest stage. That means, researchers want to achieve the lowest possible temperature by the cryocooler at the cold platform to which the object under study is attached. At the same time, the Cold Platform must be able to handle significant parasitic and active heat loads generated during the experiment. Both these objectives are very hard to achieve simultaneously with the systems currently available in market. Typically, if the cryocooler is reaching 4K temperature at the coldest point of the cryocooler, the cold platform which is mounted on the Manipulator Stage(s) will experience significant loss of temperature as well as refrigeration capacity at the cold platform. The loss of temperature and refrigeration performance are not acceptable for a researcher who needs to get the sample under test to 4K temperature with highest possible refrigeration capacity to handle heat loads.

This loss in temperature and refrigeration capacity is due to several reasons. The Manipulator Stage(s) experience loss of load carrying capacity as they get cold from room temperature. Typically, user installs Manipulator stages on the cold stage of the cryocooler. Then the cold platform is installed on top of the Manipulator. The Manipulator stages are generally made of materials such as stainless steel, ceramics, titanium, etc. that are poor in thermal conduction at cryogenic temperatures. This creates a large difference in temperature between the cryocooler stage and the cold platform to which object under study is mounted. So, while the cryocooler stage can reach 4K or below in temperature, the cold platform can be at significantly higher temperatures. It also has very low refrigeration capacity to carry thermal loads, as the manipulator stages being poor in heat transfer and cannot remove heat load from cold platform to the cryocooler.

To minimize this problem, some systems are available that connect the cryocooler stage to the cold platform using a thermal link. The thermal link is typically a high thermal conductivity flexible copper or aluminum braid such as described in U.S. Pat. No. 8,516,834 (FIGS. 8, 9 and 15*a-c*). However, this setup, though better than not having any link, still does not provide both requirements of lowest cryogenic temperature and highest heat load capacity at the cold platform. This is because as the link gets colder and reaches cryogenic temperatures, it becomes stiffer and loses flexibility that it has at room temperature. So, a link with large cross section becomes very stiff and the manipulator cannot move it once a cryogenic temperature is reached as manipulators do not have enough load carrying capacity at such temperatures. So, such devices have thermal link with smaller cross sections. This allows the manipulator to move the cold platform but cannot provide the lowest cryogenic temperature or highest heat load carrying capacity.

In order to overcome the difficulties and shortcomings of present systems and technologies employed in cooling a sample on a X-Y-Z manipulator at cryogenic temperature, a different concept is proposed.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a cryogenic system including a cryostat. The cryostat includes a vacuum housing, a cold station having a cold stage within the vacuum housing, a motion manipulator supported by the cold station, a cold platform supported by the motion manipulator, wherein a movement of the motion manipulator in a direction moves the cold platform in the direction; a thermal insulating spacer connected between the motion manipulator and the cold platform, and a cooling circuit that circulates a cryogenic fluid within the cryostat to cool the cold platform to cryogenic temperatures of at most 10K while allowing movement of the cold platform via the motion manipulator. The cryostat may also include a remote cooling apparatus configured to connect to the cryostat and recycle cryogenic fluid to the cryostat at cryogenic temperatures.

According to aspects described herein, an exemplary cryostat for cryogenic cooling of a test sample moveable by a motion manipulator is described. The exemplary cryostat includes a vacuum housing, a cold station having a cold stage within the vacuum housing, a motion manipulator supported by the cold station, a cold platform supported by the motion manipulator, wherein a movement of the motion manipulator in a direction moves the cold platform in the direction; a thermal insulating spacer connected between the motion manipulator and the cold platform, and a cooling circuit that circulates a cryogenic fluid within the cryostat to cool the cold platform to cryogenic temperatures of at most 10K (i.e., 10 k or below) while allowing movement of the cold platform via the motion manipulator. In examples, the motion manipulator may include at least one of an X-Y-Z motion manipulator, an angular motion manipulator and a rotational motion manipulator. The motion manipulator may be mounted on the cold station and support the cold platform with the thermally insulating spacer between the manipulator and the cold platform to thermally insulate the cold platform from a temperature of the manipulator so that the temperature of the manipulator does not affect the cryogenic temperatures at the cold platform. In certain examples, the cooling circuit is separated from the motion manipulator so that cryogenic fluid within the cryostat does not affect operation of the motion manipulator.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
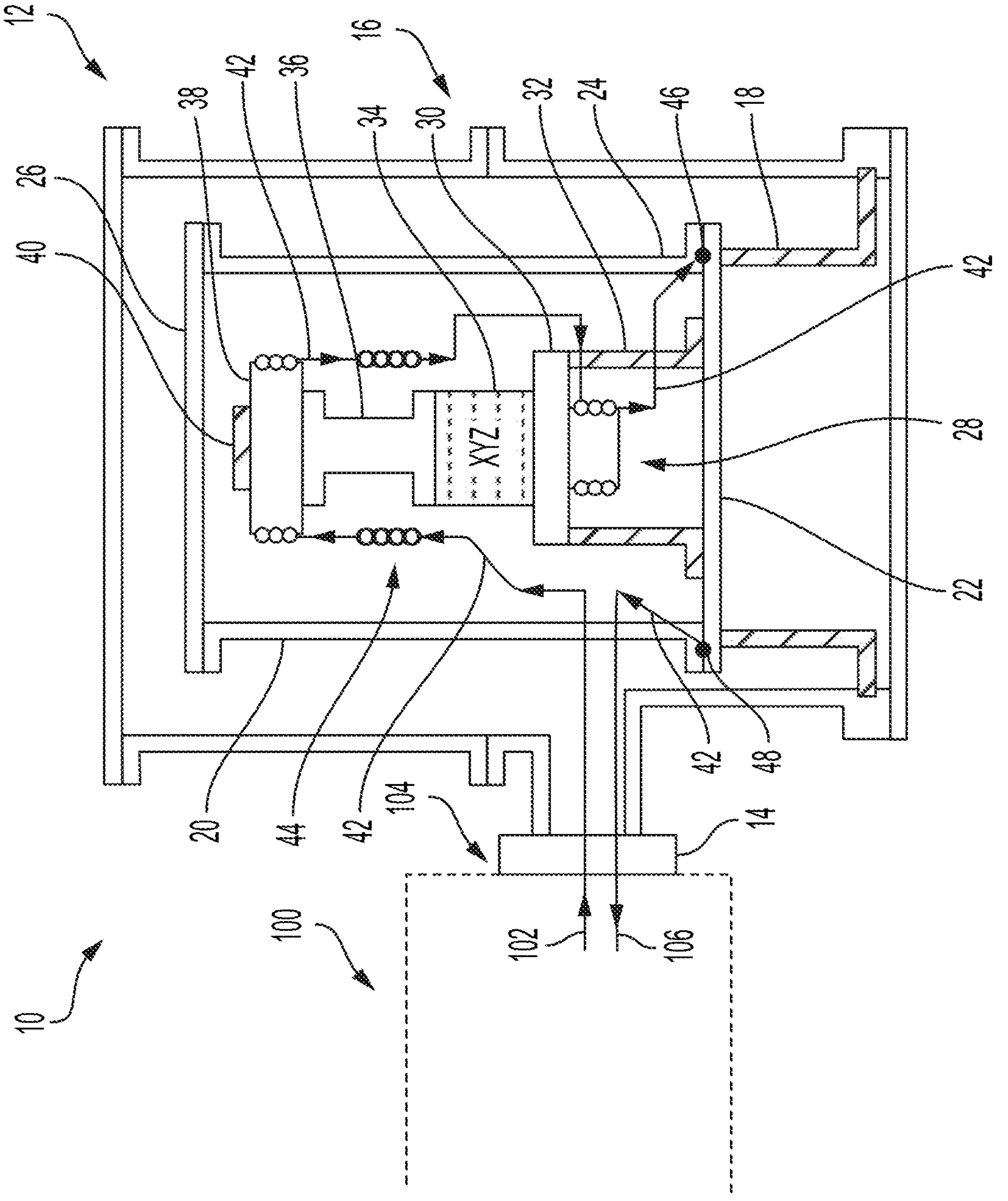
FIG. 1 is a schematic view of a cryogenic cooling system in accordance with examples of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for inking from an inking member to the reimageable surface of a digital imaging member.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

X-Y-Z motion refers generally to movement along the three axes of a Cartesian coordinate system, which are typically used to describe the position and motion of objects in three-dimensional space. For example, X-axis or direction usually represents horizontal motion (e.g., from left to right). Y-axis or direction typically represents vertical motion (e.g., from bottom to top). Z-axis or direction usually represents depth, moving in and out of the plane formed by the X and Y axes. In practical applications, X-Y-Z motion allows for precise control and description of an object's position and movement in 3D space.

Exemplary cryogenic systems as described herein may achieve the most refrigeration capacity and the lowest cryogenic temperature at the cold platform while using motion manipulators. In examples, the cryogenic system allows a Cold Platform that is physically attached to XYZ motion manipulator(s) and/or angular motion manipulator(s) to be cooled to cryogenic temperatures of about 4K, which is similar to that achieved by the coldest stage of the cryocooler and at the same time provides significantly higher cryogenic refrigeration capacity in the range of 100 milli-watts to 1000 milli-watts depending at least in part on the refrigeration capacity of the cryocooler used in the system.

In cryogenic cooling systems, a circuit typically refers to the pathway through which a cryogenic fluid, such as liquid nitrogen or helium, is circulated to absorb and remove heat from a system or component. This circuit is an essential part of the cooling system, as it allows for the transfer of thermal energy from the object being cooled to the cryogenic fluid, which is then cycled back to a refrigeration unit where it is re-cooled and recirculated. The circuit may include various components such as pumps, valves, heat exchangers, Joule-Thomson (J-T) expansion devices (e.g., J-T valve) and refrigeration units that work together to maintain the desired low temperatures.

Figure 2:
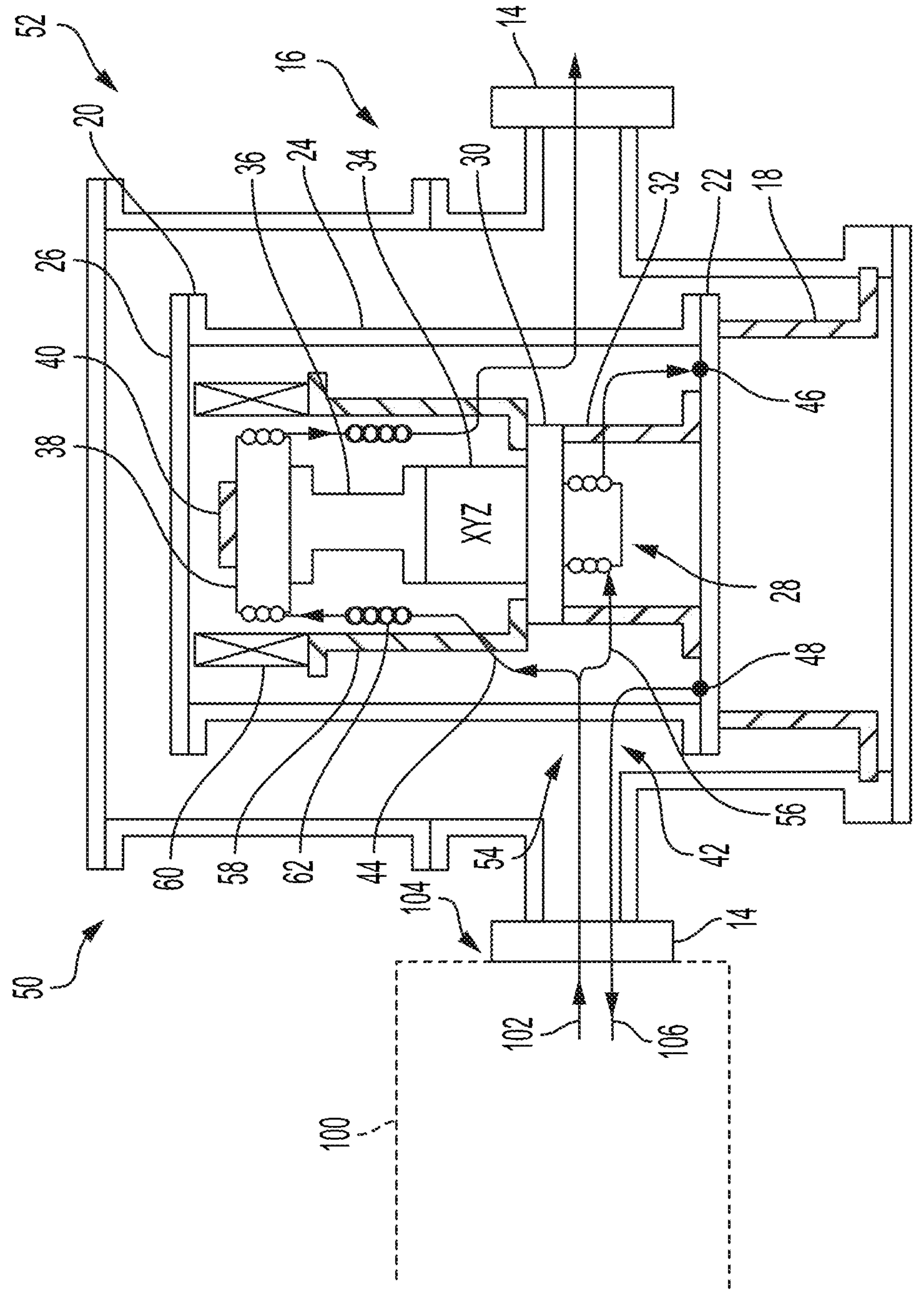
FIG. 2 is a schematic view of another cryogenic cooling system in accordance with examples of the embodiments.

FIG. 1 depicts an exemplary cryogenic cooling system 10 including a cryostat 12 that may be coupled to a remote cooling apparatus 100 (FIG. 2). An exemplary remote cooling apparatus is also discussed as a cryogenic cooling system in U.S. Pat. No. 10,684,047 (the "'047 Patent"), the contents of which is incorporated by reference in its entirety. See FIG. 3 of the '047 Patent.

The cryostat 12 includes a sealed vacuum housing 16 that provides a vacuum enclosure for the cryostat isolated from the environment. The housing 16 may include at least one sealed port 14 that allows cryogenic fluid flow into or out of the cryostat. A thermally insulating radiation shield support 18 made of thermally insulating material (e.g., G-10, high pressure fiberglass laminate, Polyether Ether Ketone (PEEK)) provides support from the vacuum housing 16 to a radiation shield 20 that intercepts and reduces heat load from thermal radiation, which is crucial for maintaining the low temperatures required in the cryostat 12. The radiation shield 20 may include a radiation base 22, walls 24 and top 26 connected into an integral housing. The radiation shield 20 houses and supports a cold station 28 having a cold stage 30 supported by a second support, referred to herein as a cold stage support 32, between the cold stage and the radiation shield. The cold station 28 may be made of very high thermal conductivity material such as oxygen-free copper (OFC). The cold stage 30 may be made of a thermally conductive material such as OFC or oxygen-free high thermal conductivity (OFHC) Copper. While not being limited to a particular shape, both the radiation shield support 18 and the cold stage support 32 are shown having a sidewall and flange extending from a bottom section of the respective sidewall.

A motion manipulator 34 is connected to the cold stage 30, and is configured to move an item thereon in at least one of X-Y-Z (3D) directions, angular directions and rotational directions, as well understood by a skilled artisan. It should be noted that while the motion manipulator 34 is also referred to herein as X-Y-Z motion manipulator or X-Y-Z manipulator, that the motion manipulator may also include an angular motion manipulator and/or a rotational motion manipulator. It is understood that a X-Y-Z motion manipulator is configured to move its top surface, or free end surface that supports a sample, in at least X-Y-Z (3D) directions. Further, an angular motion manipulator is configured to move its top surface, or free end surface that supports a sample, in at least angular orientation directions. Moreover, a rotational motion manipulator is configured to move its top surface, or free end surface that supports a sample, in at least rotational directions.

A thermally insulating spacer 36 is mounted on top of the XYZ motion manipulator 34. A cold platform 38 is mounted on top of the spacer 36. While the insulating spacer 36 is shown as having a central column between lower and upper lateral flanges, the insulating spacer is not limited to a particular shape. In examples, the insulating spacer 36 resides between the motion manipulator 34 and the cold platform 38 stage as an insulative structural spacer that moves the cold platform and sample 40 thereon directionally with X-Y-Z movement of a proximate (e.g., top, abutting) surface of the motion manipulator while providing thermal insulation therebetween. The insulating spacer 36 thermally insulates the cold platform 38 from a temperature of the motion manipulator 34 so that the temperature of the manipulator does not affect the cryogenic temperature at the cold platform.

The cryogenic cooling system 10 may include and/or be coupled to a remote cooling apparatus 100 (FIG. 2) designed to supply cryogenic fluid (e.g., cold gaseous or liquid helium, nitrogen or other cryogen, refrigerant) to the cryostat 12. In examples, cryogenic fluid supplied from the remote cooling apparatus 100 via a supply line 102 within a flexible interface 104 of the remote cooling apparatus to the cryostat 12 flows to a cooling circuit 42 (e.g., helium flow circuit) within the vacuum housing 16. The cooling circuit 42 is a flow circuit having a hose, tube, coil, bellows, combination thereof, or other type of transfer line of one or more of various known materials; one such material being stainless steel, that allows circulation of the cryogenic fluid within the cryostat. As can be seen by example in FIG. 1, in the cooling circuit 42 the cold cryogenic fluid flow passes through a soft flexible cryogenic conduit 44 (e.g., cryogenic hose, soft flexible coil, flexible soft metal bellow), whereupon it cools the cold platform 38 to cryogenic temperatures (e.g., 10 k or less) and continues to conductively cool the cold station 28 on which the X-Y-Z motion manipulator 34 is mounted. The cooling circuit 42 may include the flexible cryogenic conduit 44 and is coupled to the cold platform 38 for circulation of the cryogenic fluid thereby and cooling the cold platform to cryogenic temperatures, even during movement of the cold platform in the X-Y-Z direction via the X-Y-Z motion manipulator 34. In examples, the cooling circuit 42 is isolated from the X-Y-Z motion manipulator 34 so that cryogenic fluid within the cryostat 12 does not affect operation of the X-Y-Z motion manipulator.

The cold station 28 is in thermal contact with the cryogenic fluid, and can be used to thermally ground and intercept heat load from any instrumentation (e.g., wires, cables, optical fibers, etc.) feed through that the cryostat 12 may include for conducting experiments. Still referring to FIG. 1, the cryogenic fluid flow may continue beyond the cold station 28 through a cooling loop on the radiation shield base 22 accessed via port 46 and cool the radiation shield 20 that envelopes the experiment region within. The cooling circuit cryogenic fluid may flow through a cooling channel (not shown) within the radiation shield base 22 and exit via port 48 and return to the remote cooling apparatus 100 (e.g., Stinger®) via a return line 106 in the flexible interface 104.

FIG. 2 is schematic view depicting another cryogenic cooling system 50 in accordance with examples of the embodiments. In this system configuration, the cooling system 50 includes a cryostat 52 that may be attached to the remote cooling apparatus 100 for supply and return of cryogenic fluid, as also shown in FIG. 1.

Similar to the cryostat 12 depicted in FIG. 1, the cryostat 52 includes a vacuum housing 16 which provides vacuum enclosure for the cryostat. The housing 16 includes sealed ports 14 that allows cryogenic fluid flow into or out of the cryostat 52. Radiation shield support 18 provides support from the vacuum housing 16 to the radiation shield 20. Another thermally insulating support structure, referred to herein as the cold stage support 32 provides support from radiation shield 20 to the cold station 28 which includes the cold stage 30. The motion manipulator 34 is physically connected on top of the cold station 28 and provides motion in X-Y-Z directions to the thermally insulating spacer 36 mounted on top of the motion manipulator. The cold platform 38 is shown mounted on top of the spacer 36. The insulating spacer 36 thermally insulates the cold platform 38 from a temperature of the motion manipulator 34 so that the temperature of the manipulator does not affect the cryogenic temperature at the cold platform and sample 40.

The cryogenic fluid (e.g., gaseous or liquid helium, nitrogen or other cryogen) supplied by the remote cooling apparatus 100 via the flexible interface 104 enters the cryostat 52 and may be split into a plurality of separate streams of flows which allows for independent temperature control via the separate streams. Still referring to FIG. 2, the cooling circuit 42 includes a split flow circuit 54 having a flexible cryogenic conduit 44 (e.g., cryogenic hose, soft flexible coil, flexible soft metal bellow) with cryogenic fluid stream flowing there through to cool the cold platform 38 and then exit the cryostat 52. By example, cryogenic fluid stream flows within the flexible cryogenic conduit 44 through a soft flexible coil 62 or metal bellow thereof. Then the flow stream cools the cold platform 38 to a cryogenic temperature (e.g., at most 10K, about 4.2K). The cryogenic fluid flow stream then may exit the cryostat 52 through an exit port 14. This flow may then be directed to a recirculator 108 (FIG. 3) of the remote cooling apparatus 100.

The split flow circuit 54 further includes a second flexible cryogenic conduit 56 having a cryogenic fluid flow stream flowing there through and cools the cold station 28, cold extension 58 and an additional cryogenic device 60 (e.g., superconducting magnet) via cryogenic fluid refrigerant flow via the second cryogenic conduit 56 to the cryogenic device and the radiation shield 20. While not being limited to a particular theory, the cryogen flow may cool the cold station 28, cold extension, additional cryogenic device 60, radiation shield 20, and stage via conductive cooling and/or direct contact with the cryogen (e.g., radiation shield base 22), as understood by a skilled artisan. The second flow stream may flow within the second cryogenic conduit 56 to cold station 28 on which the X-Y-Z motion manipulator 34 is mounted and cool the cold station to cryogenic temperature.

As can be seen in FIG. 2, the cold extension 58 is mounted on the cold station 28. The cold extension 58 may be made of very high thermal conductivity material such as oxygen-free copper or aluminum, and can be used to mount an additional cryogenic device 60 to be cooled to cryogenic temperature. The cryogenic device 60 may be placed such that it surrounds the cold platform 38. The second flow stream then goes through the radiation shield cooling loop via entry through port 46, circulation within the radiation shield 20 and exit out of port 48, and thereby cools the radiation shield that envelopes the sample 40 under study. The flow through the second flexible cryogenic conduit 56 then exits the cryostat 52 and enters the remote cooling apparatus 100 via return line 106.

The split flow configuration depicted by example in FIG. 2 allows the additional cryogenic device 60 to be cooled to cryogenic temperatures along with the cold platform 38. It also allows for a lowest cryogenic temperature at both the cold platform 38 and the cryogenic device 60, and provides high cryogenic refrigeration capacity while providing X-Y-Z manipulation of the sample 40 under study. No thermal braids are required between the cold station 28 and the cold platform 38 to achieve the cryogenic temperature (e.g., at most 10K, below 6K, below 4K). Another benefit from the split flow configuration is that the temperature of the cold platform 38 and sample 40 can be varied from cryogenic temperatures to normal ambient temperatures while still maintaining the cryogenic device 60 at cryogenic temperatures. This allows a researcher to study the sample on the cold station at any desired temperature, and further allows independent temperature control of the cold platform 38 and the cryogenic device 60, for example, via use of flow control valves in the split flow circuit 54 as readily understood by a skilled artisan.

Figure 3:
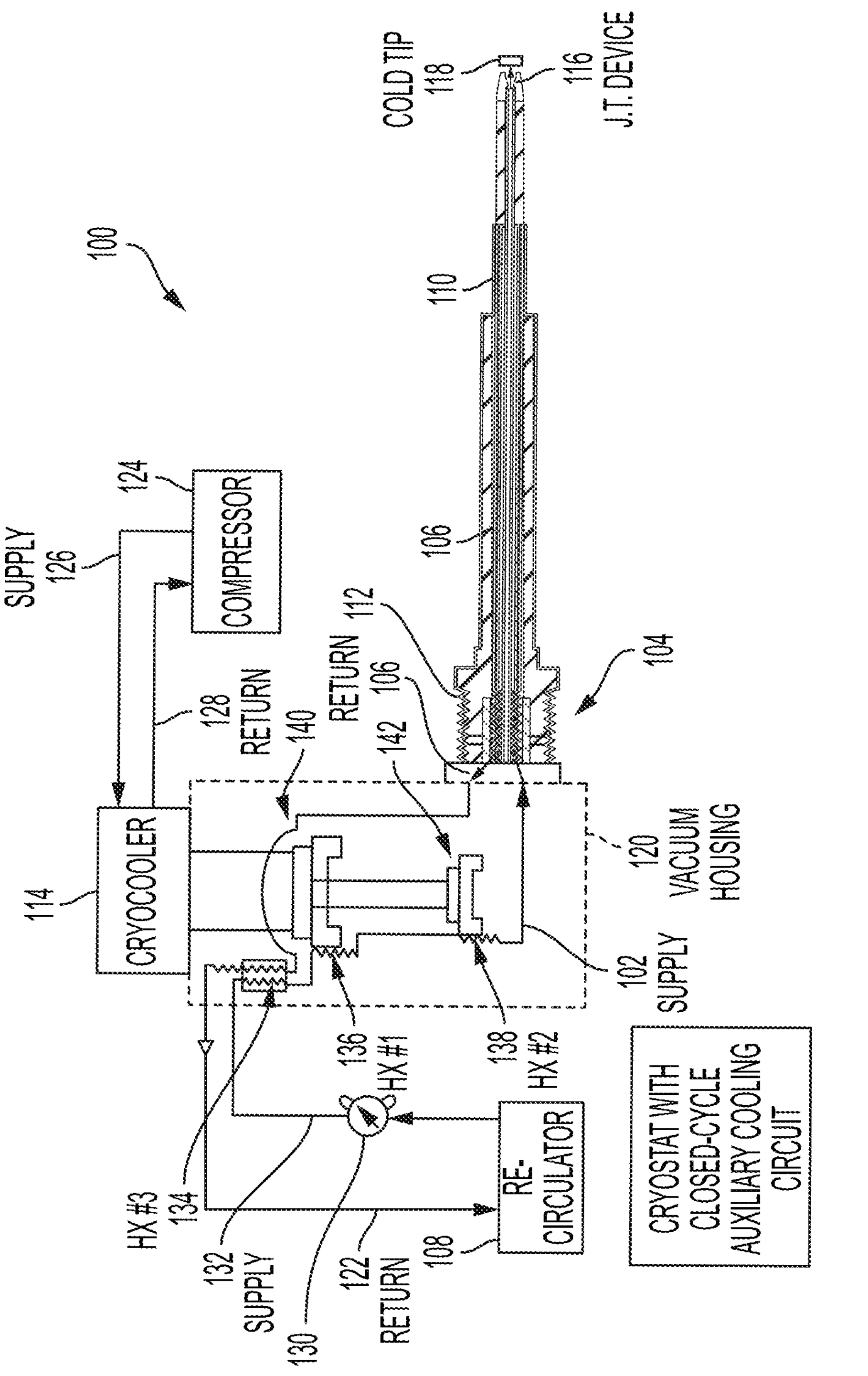
FIG. 3 is a schematic view of an exemplary remote cooling apparatus.

FIG. 3 is a block diagram representing an exemplary embodiment of a remote cooling apparatus 100 having a flexible interface 104 for the transfer of cryogenic fluid (also referred to as "cryogen") to a cryostat 12, 52 with a cooling circuit 42. The flexible interface 104 may include a flexible supply line 102 for the transfer of cryogenic fluid. The flexible supply line 102 may be a hose, tube, or other type of transfer line of one or more of various known materials; one such material being stainless steel. The flexible supply line 102 is shown disposed longitudinally through a flexible inner hose 110. Arranged substantially concentrically with and outside of the flexible inner hose 110 is a flexible middle hose 106, also referred to as the return line 106 (FIGS. 1 and 2) for the transfer of cryogenic fluid, permitting the return flow of the cryogenic fluid from the cryostat 12, 52. Arranged substantially concentrically to and outside of both the flexible inner hose 110 and the flexible middle hose 106 is a flexible outer hose 112 serving to insulate the portions inside of it, including the flexible inner hose 110, flexible supply line 102 and flexible middle hose 106, from ambient temperatures. Each of the flexible inner hose 110, flexible middle hose 106 and flexible outer hose 112 is a hose, tube, or other type of transfer line of one or more of various known materials; one such material being stainless steel.

The flexible supply line 102 and the flexible return line 106 are configured for the transfer of cryogenic fluid, such as, by non-limiting example, gaseous or liquid helium, nitrogen or other cryogen. In examples, multi-layer insulation may be disposed on an outer wall of the flexible supply line 102 and on the outer wall of the flexible middle hose 106. This multi-layer insulation serves to further insulate the supply flow of cryogenic fluid within the supply line 102 and the return flow 106 of cryogenic fluid within the flexible middle hose 106, thereby maintaining temperatures of the cryogenic fluid within the system at relatively low temperatures throughout operation of the cryogenic cooling system 10.

In the exemplary remote cooling apparatus 100 depicted in FIG. 3, the first terminal end of the flexible interface 104 includes a connector for connecting the flexible interface to a cryocooler 114 shown in a vacuum housing 120. The connector is constructed to be compatible with one or more existing cryocoolers with which the interface will be used.

The flexible interface 104 may be connected to a cryocooler 114 with the closed loop cryogen recirculator 108. In this embodiment the cryocooler 114 is housed in a sealed vacuum housing 120 and is cooled by a compressor 124 having a compressor supply line 126 and a compressor return line 128 connected to the cryocooler 114. Cryogen may be supplied to the cryocooler 114 from a source, such as the recirculator 108. The rate of flow of cryogen from the recirculator 108 may be controlled by operation of a pressure regulator 130 connected to the recirculator. This flow of cryogenic fluid is delivered via a cryogen supply line 132 to the inlet port of the cryocooler 114 and the flexible supply line 102. The cryocooler 114 reduces the temperature of the cryogen as the cryogen passes through three heat exchangers 134, 136, 138, which may be of various known types, such as counterflow heat exchangers. In examples, the cryogen passes first through counterflow heat exchanger #3 134 and then through heat exchanger #1 136, resulting in reduction in temperature of the cryogen to an intermediate temperature. The cryogen then passes through heat exchanger #2 138 where the cryogen temperature is further reduced to the minimum temperature achievable by the cryocooler 114. In certain examples, such minimum temperature achievable by the cryocooler 114 is in the range of about 4-10K.

Cryogen in the supply line 102 may be transferred through the flexible interface 104 and a Joule-Thomson device 116 adjacent a cold tip 118 to the cryostat 12, 52. The second terminal end of the flexible interface 104 may include the cold tip 118 operational to be inserted into or otherwise coupled to the cryostat 12, 52 as well understood by a skilled artisan.

After cycling through the cryostat 12, 52, the return cryogenic fluid returns to the remote cooling apparatus 100 via the flexible middle hose 106. The return line and cryogen therein passes through the flexible interface 104 and returns to the cryocooler 114. Within the cryocooler the return flow 106 passes through counterflow heat exchanger #3 134 where it provides an initial cooling to the return fluid. The return fluid may then be supplied via a recirculator return line 122 to the recirculator 108, which may again supply the returned cryogen to the cryocooler circuit.

Within the cryocooler 114, the recirculated cryogenic fluid passes through counter-flow heat exchanger #3 134, which cools the cryogen from room or recirculated temperature to an intermediate lower temperature by using the cooling power of the colder return cryogen. The pre-cooled cryogen then passes through heat exchanger #1 136, which is in direct thermal contact with a first stage 140 of the cryocooler 114. The cryogenic fluid is cooled further on this stage closer to the first stage temperature of the cryocooler ranging from 30K to 100K. The cryogen then passes through heat exchanger #2 138, which is in direct thermal contact with the second stage 142 of the cryocooler that is at the lowest temperature that the cryocooler 114 can achieve. The cryogen is cooled to a temperature very close to the second stage of the cryocooler typically ranging from 4K to 25K. The cooled cryogen within the flexible supply line 102 may be routed through a Joule-Thomson device (not shown) within the housing of the cryocooler 114.

The cooled cryogen within the flexible supply line 102 enters the flexible interface 104 and is delivered to the cold tip 118 for transfer to the cryostat 12, 52. A Joule-Thomson device 116 may be located proximate to the terminal end of the flexible interface 104 and may provide expansion cooling and an additional drop in cryogenic fluid temperature prior to delivery of the cryogen to the cryostat 12, 52.

Figure 4:
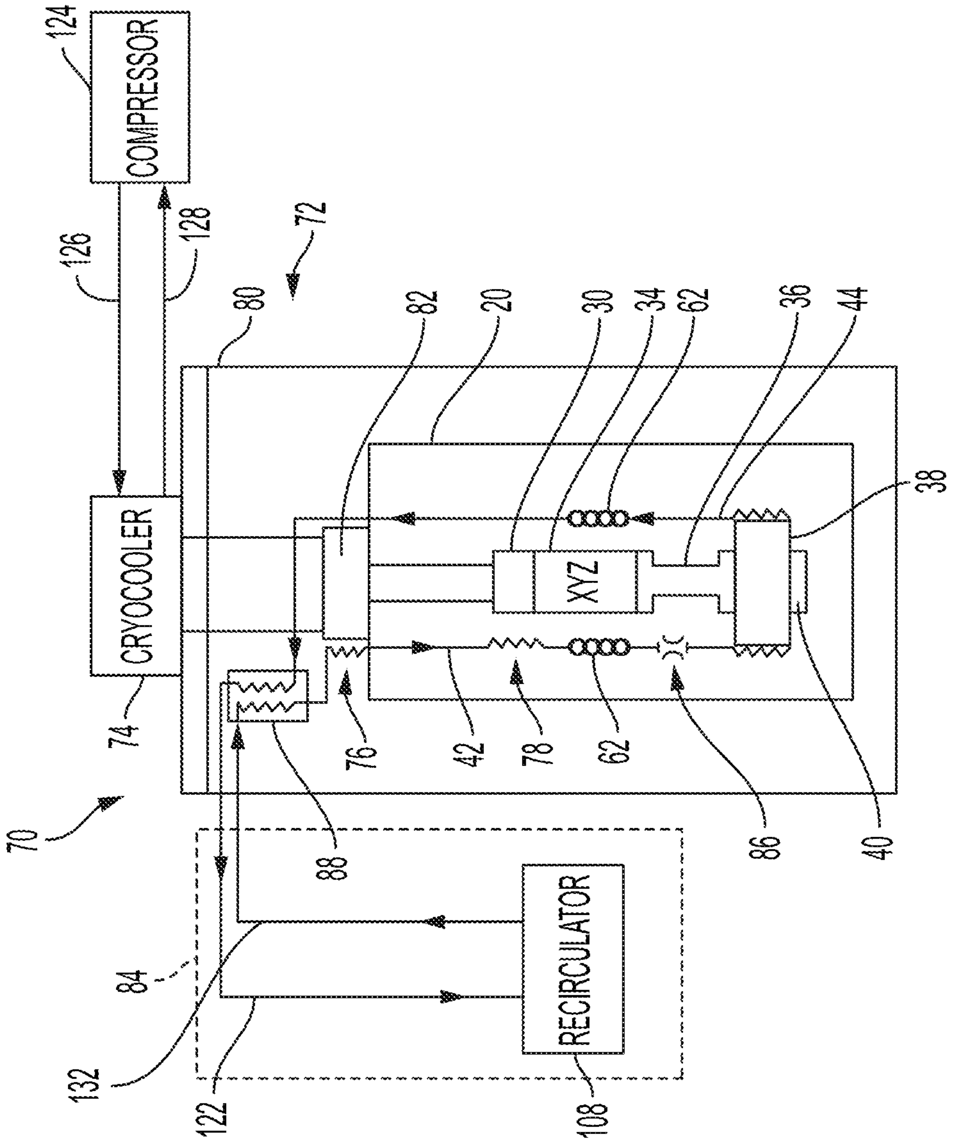
FIG. 4 is a schematic view of yet another exemplary cryogenic cooling system in accordance with examples of the embodiments.

FIG. 4 is schematic view depicting another cryogenic cooling system 70 in accordance with examples of the embodiments. The cooling system 70 includes a cryostat 72 that may be part of or directly attached to a cryocooler 74 and a closed loop cryogen recirculator 108 for cooling and recirculating cryogenic fluid within the cryostat. A vacuum housing 80 is attached to the warm flange of the cryocooler 74 and envelopes all the components within the cryostat 72. The housing 80 is kept under vacuum during operation, as understood by a skilled artisan. While not being limited to a particular orientation, elements within the cryostat 72 may appear vertically upside-down in comparison to like elements shown in FIGS. 1 and 2. It should be noted that the cryogenic cooling system 10, 50, 70 may be operated in any orientation and is not limited to any particular orientation, as is readily understood by a skilled artisan.

In this example, the cryocooler 74 is cooled by compressor 124 via a compressor supply line 126 and a compressor return line 128 coupled therebetween. Cryocooler 74 may be employed to provide primary cryogenic cooling to the cryostat 72. The cryocooler 74 may be of any variety including Gifford-McMahon type, Pulse tube type, etc. The cryostat 72 includes a first stage 82 and a second or intermediate cold stage 30 that may be separated by a radiation shield 20. As can be seen in FIG. 4, the radiation shield 20 is thermally connected to the first stage 82 of the cryocooler and envelopes the intermediate cold stage 30 and cold platform 38. This minimizes radiation load on the cold platform 38. The first stage 82 operates at a higher temperature range (e.g., about 30K to 50K) and serves as a thermal anchor for the radiation shield 20, which helps to minimize heat transfer to the colder cold stage. The cold stage 30 may be spaced from the radiation shield 20 by cold stage support 32, and operates at a lower temperature range (e.g., about 4K to 10K).

The X-Y-Z motion manipulator 34 is mounted to the cold stage 30, and the thermally insulating spacer 36 is attached to the motion manipulator opposite the cold stage. The insulating spacer 36 may be made of G-10, Peek, or similar insulating material that is cryogenically compatible. A cold platform 38 is attached to the insulating spacer 36 opposite the motion manipulator 34 in a manner that the insulating spacer thermally isolates the cold platform from the motion manipulator. Consistent with the examples, the insulating spacer 38 moves the cold platform and sample 40 directionally with X-Y-Z movement of a proximate (e.g., abutting) surface of the motion manipulator 34 while providing thermal insulation therebetween. The insulating spacer 36 thermally insulates the cold platform 38 from a temperature of the motion manipulator 34 so that the temperature of the manipulator does not affect the cryogenic temperature at the cold platform.

A cooling circuit 42 and its flexible cryogenic conduit 44 is integrated within the cryogenic cooling system 70 and is coupled to the cold platform 38 for circulation of the cryogenic fluid thereby and cooling the cold platform to cryogenic temperatures, even during movement of the cold platform in the X-Y-Z direction via the X-Y-Z motion manipulator 34. The cooling circuit 42 is isolated from the X-Y-Z motion manipulator 34 so that cryogenic fluid within the cryostat 12 does not affect operation of the X-Y-Z motion manipulator. The cooling circuit 42 may include an auxiliary cryogen flow circuit 84 outside of the vacuum housing 80 that includes the recirculator 108, flexible supply line 132, flexible return line 122 and associated fittings as needed to connect to cryostat 72, as understood by a skilled artisan.

The auxiliary cryogen flow circuit 84 supplies high pressure cryogen/cryogenic fluid (e.g., helium gas at 5 atm. to 20 atm.) from the recirculator 108, which may include a compressor. This high-pressure flow is first cooled at the first stage 78 of the cryostat 72 using, for example, a heat exchanger #1 76. The cooled flow continues through the radiation shield 20 and is then cooled on the cold stage 30 of the cryostat 72 using another heat exchanger #2 78 to lower temperatures (e.g., about 4K-10K). The cryogenic fluid then may pass through a very flexible coil 62 and then through a Joule-Thomson (J-T) expansion device 86 (e.g., J-T valve, insulated J-T valve). At the J-T expansion device 86, the cryogen undergoes isenthalpic Joule-Thompson expansion to lower pressure—typically to atmospheric pressure or below atmospheric pressure—thereby producing a further drop in temperature. This cold cryogen then flows to cool the cold platform 38 to cryogenic temperatures including about 4.2K or lower with a high refrigeration capacity of 100 milli-watts to 1000 milli-watts at the cold platform. The low pressure cold cryogen then continues to return flow out of the radiation shield 20, and further continues through another heat exchanger #3 88 and cools the incoming warm high pressure cryogenic fluid flow from flexible supply line 132. The return cryogen flow then exhausts out of the cryostat 72 and returns to the recirculator 108 compressor, thereby completing the cooling circuit 42.

In the examples, the X-Y-Z motion manipulator 34 has no influence on the temperature reached by the cold platform 38. This is because the cold platform is directly cooled by the cryogen fluid flow. The manipulator is connected to the second or cold stage 30 of the cryocooler on one side. This motion manipulator 34 is typically made of thermally poor conducting materials such as stainless steel, titanium, ceramics, etc. Hence temperature gradient through the manipulator is quite high. This however does not affect the final temperature that the Cold Platform can achieve. A motion manipulator can move cold platform 38 in X-Y-Z directions without having influence on the final temperature reached by the cold platform. Thus, the sample 40 under study which is mounted on the cold platform 38 can reach lowest possible temperatures.

In certain examples, the X-Y-Z motion manipulator 34 may be mounted on the first stage 78 of the cryogenic cooling system 70. In an approach to get higher load carrying capacity from the motion manipulator 34, the manipulator may be installed on the warmer first stage 82 of the cryocooler. The motion manipulator 34 may also be installed on the radiation shield 20 near the first stage 82. The thermally insulating spacer 36 and cold platform 38 may be installed on the motion manipulator 34 in similar arrangement as described above.

The examples help to minimize problems of X-Y-Z motion manipulators losing capacity in producing force as the temperature at the motion manipulator approaches cryogenic temperatures. Typical motion manipulators have a reduction in capacity to generate force (e.g., lifting and angular) as it approaches cryogenic temperatures from room temperature. The manipulator may lose more than 60% of its capacity at cryogenic temperature. This is a significant problem as scientists need to move the thermal mass attached to the cold platform in X-Y-Z or three dimensional directions as well as rotational directions when cooling systems reaches cryogenic temperatures. The loss in force generating capability by manipulators means the mass that can be manipulated at cryogenic temperatures is quite small. When flexible braids are used with manipulators to achieve lower temperatures, it creates another problem. As the flexible connections, such as braids, get colder, they become very stiff and do not flex like they do at room temperature. This also limits how much mass can be carried by the motion manipulator.

For the reasons described above, keeping motion manipulators at higher temperatures—typically between 30K to 100K—is desirable for appropriate and reliable movement of the cold platform. The warmer temperatures at the motion manipulator in comparison to the cold platform, allows the motion manipulator to generate greater force and manipulate larger mass than if the motion manipulator were forced to operate at cryogenic temperatures. In the examples, keeping the motion manipulator at higher temperatures does not limit the minimum cryogenic temperature on the cold platform which needs to be at lowest cryogenic temperature for the researcher.

We have described several arrangements that provide uniquely higher performance for a cryogenic system that employs motion manipulators. It is understood that the examples are not limited to X-Y-Z direction motion manipulators, and may also include other types of motion manipulators, including angular motion manipulators and rotational manipulators. These configurations provide highly efficient and high refrigeration cooling capacity directly on the cold platform and at the same time provide the lowest cryogenic temperature with much higher force generating capacity for the motion manipulators within the cryostat that may move the cold platform and sample thereon. High temperature gradient through the motion manipulator does not affect the cryogenic temperature achieved on the cold platform. The examples also allow faster cooldown of the cold platform as it does not need to cool through thin braids or manipulators with poor thermal conduction.

The system arrangement shown above explains general principles and arrangements that may be employed. It is not an exhaustive list since different combinations and arrangements of system components explained above could be utilized to achieve similar goals.

Those skilled in the art will appreciate that other embodiments of the disclosed subject matter may be practiced with many types of cryogenic systems in many different configurations. For example, the cryostats with motion manipulator, cold platform and thermally insulating spacer therebetween may be used within cryostats used with various cooling apparatuses including auxiliary closed-cycle cooling circuits, auxiliary open-cycle cooling circuits and/or remote cooling apparatuses. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A cryogenic system, comprising:

a cryostat including:

- a vacuum housing;
- a cold station having a cold stage within the vacuum housing;
- a motion manipulator supported by the cold station;
- a cold platform supported by the motion manipulator, wherein a movement of the motion manipulator in a direction moves the cold platform in the direction;
- a thermal insulating spacer connected between the motion manipulator and the cold platform; and
- a cooling circuit that circulates a cryogenic fluid within the cryostat to cool the cold platform to cryogenic temperatures of at most 10K while allowing movement of the cold platform via the motion manipulator.

2. The cryogenic system of claim 1, wherein the motion manipulator includes an X-Y-Z motion manipulator.

3. The cryogenic system of claim 1, wherein the motion manipulator includes at least one of an X-Y-Z motion manipulator, an angular motion manipulator and a rotational motion manipulator.

4. The cryogenic system of claim 1, wherein the motion manipulator is mounted on the cold station and supports the cold platform with the thermally insulating spacer between the manipulator and the cold platform to thermally insulate the cold platform from a temperature of the manipulator so that the temperature of the manipulator does not affect the cryogenic temperatures at the cold platform.

5. The cryogenic system of claim 1, wherein the cooling circuit is separated from the motion manipulator so that the cryogenic fluid within the cryostat does not affect operation of the motion manipulator.

6. The cryogenic system of claim 1, wherein the cooling circuit is a flow circuit that includes a flexible cryogenic conduit and is coupled to the cold platform for circulation of the cryogenic fluid thereby and conductively cooling the cold platform to the cryogenic temperatures during movement of the cold platform via the motion manipulator.

7. The cryogenic system of claim 6, wherein the flexible cryogenic conduit includes a flexible coil.

8. The cryogenic system of claim 6, wherein the flexible cryogenic conduit includes one of a flexible coil and a flexible metal bellow.

9. The cryogenic system of claim 1, wherein the cooling circuit is a flow circuit that includes a flexible cryogenic conduit that circulates the cryogenic fluid within the cryostat between the cold station and the cold platform absent a thermal braid connection.

10. The cryogenic system of claim 1, the cooling circuit further comprising an auxiliary flow circuit including a return line, a recirculator compressor and a supply line for compressing the cryogenic fluid and returning the compressed cryogenic fluid within the vacuum housing to cool the cold platform.

11. The cryogenic system of claim 1, the cryostat further including a radiation shield that envelopes the cold station, the motion manipulator, the thermal insulating spacer and the cold platform.

12. The cryogenic system of claim 11, the cryostat further including a first stage thermally connected to a radiation shield opposite the cold stage.

13. The cryogenic system of claim 1, the cryostat further including a radiation shield within the vacuum housing, a cold extension connected to the cold station, and a cryogenic device supported by the cold station, the radiation shield housing the cold extension, the cold station and the cryogenic device.

* * * * *